(12) United States Patent
Cotner et al.

(10) Patent No.: US 7,603,336 B2
(45) Date of Patent: Oct. 13, 2009

(54) PEEPHOLE DBMS REORGANIZATION ALLOWING CONCURRENT DATA MANIPULATION

(75) Inventors: Curt Lee Cotner, Gilroy, CA (US); James Alan Ruddy, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 11/313,117

(22) Filed: Dec. 19, 2005

(65) Prior Publication Data
US 2007/0143313 A1   Jun. 21, 2007

(51) Int. Cl.
*G06F 7/00* (2006.01)

(52) U.S. Cl. .............................. 707/1; 707/100; 707/101

(58) Field of Classification Search ........................ None
See application file for complete search history.

(56) References Cited

U.S. PATENT DOCUMENTS

| | | | | |
|---|---|---|---|---|
| 5,222,235 | A | 6/1993 | Hintz et al. | 395/600 |
| 5,495,601 | A | 2/1996 | Narang et al. | 395/600 |
| 6,026,412 | A | 2/2000 | Sockut et al. | 707/200 |
| 6,453,404 | B1* | 9/2002 | Bereznyi et al. | 711/171 |
| 6,499,039 | B1 | 12/2002 | Venkatesh et al. | 707/204 |
| 6,519,613 | B1 | 2/2003 | Friske et al. | 707/202 |
| 6,606,631 | B1 | 8/2003 | Martin, Jr. et al. | 707/101 |
| 6,622,142 | B1 | 9/2003 | Murray et al. | 707/100 |
| 6,871,295 | B2 | 3/2005 | Ulrich et al. | 714/6 |
| 7,366,727 | B2* | 4/2008 | Heusermann et al. | 707/101 |
| 2002/0143743 | A1* | 10/2002 | Iyer et al. | 707/1 |
| 2002/0198860 | A1* | 12/2002 | Smith | 707/1 |
| 2003/0135478 | A1* | 7/2003 | Marshall et al. | 707/1 |
| 2004/0215632 | A1* | 10/2004 | Isip et al. | 707/100 |
| 2005/0027729 | A1 | 2/2005 | Kuchinsky et al. | 707/100 |
| 2005/0270856 | A1* | 12/2005 | Earhart et al. | 365/189.05 |
| 2006/0004951 | A1* | 1/2006 | Rudelic et al. | 711/103 |
| 2006/0047719 | A1* | 3/2006 | Hershkovich et al. | 707/204 |

OTHER PUBLICATIONS

Ding, C. et al.; Improving Cache Performance in Dynamic Applications through Data and Computation Reorganization at Run Time, 1999, ACM 1-58113-083-X/99/0004.

Palem, K. V. et al.; Design Space Optimization of Embedded Memory Systems via Data Remapping, 2002, ACM 1-58113-527-0/02/0006.

(Continued)

*Primary Examiner*—Tim T. Vo
*Assistant Examiner*—Jau-Shya Meng
(74) *Attorney, Agent, or Firm*—Kunzler & McKenzie (57) ABSTRACT

A method, apparatus and program storage device readable by a computer tangibly embodying a program of instructions executable by the computer is provided for reorganization of database data. The computer database reorganization method reorganizes one set of database data blocks at a time, allowing concurrent data manipulation. Method identifies a set of data blocks for reorganization in a sliding peephole mode, re-orders the set of data blocks and replaces the original set of data blocks with the re-ordered set of data blocks. The method include an overlapping peephole method, which chooses, for each set of data block to be reorganized, a next succeeding set of data blocks plus an overlap segment, wherein the overlap segment includes a set of empty pages other than intentionally specified free pages, and the overlap segment is a subset of the preceding set of data blocks.

38 Claims, 8 Drawing Sheets

OTHER PUBLICATIONS

Luk, C-K, et al.; Memory Forwarding: Enabling Aggressive Layout Optimizations by Guaranteeing the Safety of Data Relocation, 1999, IEEE 1063-6897/99.

Scheuermann, P. et al.: Data Partitioning and Load Balancing in Parallel Disk Systems, 1998, Spring-Verlag.

PCT International Search Report, Mar. 19, 2007.

Sockut, G. et al.; Database Reorganization—Principles and Practice, 1979, ACM Computing Surveys, vol. 11, No. 4, Dec. 1979, pp. 371-395, XP002217091.

* cited by examiner

PEEPHOLE DBMS REORGANIZATION ALLOWING CONCURRENT DATA MANIPULATION

BACKGROUND OF THE INVENTION

1. Field of the Invention

The present invention generally relates to database management systems, and, more particularly, to mechanisms within computer-based database management systems for DBMS reorganization using peepholes and allowing concurrent data manipulation.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

A typical relational database management system includes both database files and index files. The database files store data in the rows and columns of tables stored on data pages while index keys, used for faster reference of the data, are stored on index pages. A page is a physical unit of transfer between main storage and secondary storage. In such a table, the rows may correspond to individual records while the columns of the table represent attributes of the records. For example, in a customer information table of a database management system, each row might represent a different customer data object while each column represents different attributes of the customers, such as the name of a particular customer, the amount owed by the customer and the cash receipts received from the customer. The actions of a transaction that cause changes to recoverable data objects are recorded in a log file or data set.

The increasing popularity of electronic commerce has prompted many companies to turn to application servers to deploy and manage their applications effectively. Quite commonly, these application servers are configured to interface with a database management system (DBMS) for storage and retrieval of data. This often means that new applications must work with distributed data environments. As a result, application developers frequently find that they have little or no control over which DBMS product is to be used to support their applications or how the database is to be designed. In many cases, developers find out that data critical to their application is spread across multiple DBMSs developed by different software vendors.

Data in a database of a Database Management System (DBMS) can, over time, become unordered and make inefficient use of data storage space. This is rectified by a reorganization process where the data sequence order is restored and the data is distributed within the available data space based upon some predefined criteria.

One presently available reorganization method involves unloading the data, sorting it and reloading sorted data into the DBMS database. If there are indexes to the data records they are typically reorganized as part of this operation. This results in a perfectly organized database with perfect restoration of free space and empty pages, albeit for a short period of time. Moreover, the reorganization is highly disruptive because data are usually unavailable to applications for data updates during this process. Newer methods provide data availability by firstly reorganizing a copy of the data and then applying any updates since the copy was made, which requires significant temporary workspace.

Other conventional techniques reorganize the data in place while making the data available. These online reorganization methods result in a pretty good organization and restoration of free space and empty pages. It is less disruptive because data are only unavailable during a switch of shadow and original database. However, these current techniques require significant temporary workspace and the reorganization has to take place on the same processing unit as users' applications or on another processor, tightly coupled to that processing unit.

Therefore, there is a need for a method and a system using a non-disruptive DBMS reorganization technique that allows concurrent data manipulation, which is designed for a loosely coupled or auxiliary processor and that efficiently uses temporary workspace, thus optimizing data storage utilization and system efficiency.

SUMMARY OF THE INVENTION

The foregoing and other objects, features, and advantages of the present invention will be apparent from the following detailed description of the preferred embodiments which makes reference to several drawing figures.

One group of preferred embodiments of the present invention are computer database reorganization methods which reorganize one set of database data blocks at a time, allowing concurrent data manipulation. Methods identify a set of data blocks for reorganization in a sliding peephole mode, re-order the set of data blocks and replace the original set of data blocks with the re-ordered set of data blocks, if possible. Preferred method embodiments include an overlapping peephole method, which chooses, for each set of data block to be reorganized, a next succeeding set of data blocks plus an overlap segment, wherein the overlap segment includes a set of empty pages other than intentionally specified free pages, and the overlap segment is a subset of the preceding set of data blocks.

Another preferred embodiment of the present invention is a system implementing the above-mentioned method embodiments of the present invention.

Yet another preferred embodiment of the present invention includes a program storage device tangibly embodying a program of instructions executable by the computer to perform method steps of the above-mentioned method embodiments of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings which form the part thereof, and in which are shown by way of illustration specific embodiments in which the invention may be practiced. It is to be understood that other embodiments may be utilized, and structural and functional changes may be made without departing from the scope of the present invention.

The present invention is directed to a system, method and program storage device embodying a program of instructions executable by a computer to perform the method of the present invention for non-disruptive peephole DBMS reorganization that allows concurrent data manipulation. It can be used in a loosely coupled or auxiliary processor and it efficiently uses temporary workspace, thus optimizing data storage utilization and system efficiency.

The method embodiments of the present invention utilize a peephole reorganization method. This method is a best effort approach to reorganization which uses a sliding peephole to reorganize data in subsets. Thus, with the peephole reorganization of the present invention only a small portion or window of data from the entire database gets reorganized at a time, such as a set or subset of data blocks, and not the whole database as in the conventional systems.

Figure 1:
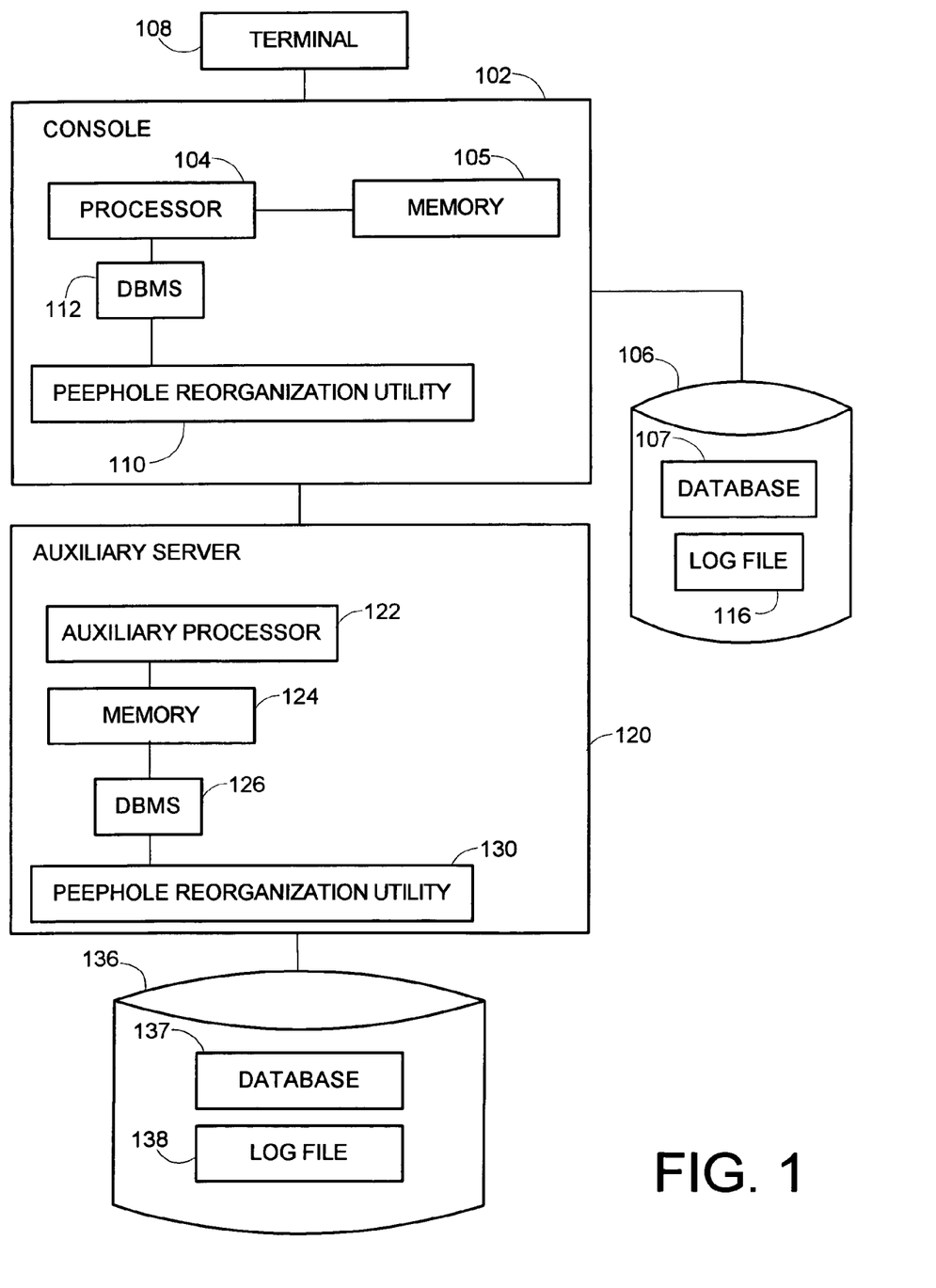
FIG. 1 illustrates a block diagram of an exemplary computer hardware and software environment enabling data reorganization, according to the preferred embodiments of the present invention.

FIG. 1 illustrates an exemplary computer hardware and software environment usable by the preferred embodiments of the present invention to enable the peephole reorganization method of the present invention. FIG. 1 includes a console 102 having one or more conventional processors 104 executing instructions stored in an associated computer memory 105 and a console terminal 108. The memory 105 can be loaded with instructions received through an optional storage drive or through an interface with a computer network.

The processor 104 is connected to one or more electronic data storage devices 106, such as disk drives, that store one or more relational databases 107. They may comprise, for example, optical disk drives, magnetic tapes and/or semiconductor memory. Each storage device permits receipt of a program storage device, such as a magnetic media diskette, magnetic tape, optical disk, semiconductor memory and other machine-readable storage device, and allows for method program steps recorded on the program storage device to be read and transferred into the computer memory. The recorded program instructions may include the code for the method embodiments of the present invention. Alternatively, the program steps can be received into the operating memory from a computer over the network.

Operators of the console terminal 108 use a standard operator terminal interface (not shown), to transmit electrical signals to and from the console 102, that represent commands for performing various tasks, such as search and retrieval functions, termed queries, against the database 107 stored on the electronic data storage device 106. In the present invention, these queries conform to the Structured Query Language (SQL) standard, and invoke functions performed by a DataBase Management System (DBMS) 112, such as a Relational DataBase Management System (RDBMS) software. In the preferred embodiments of the present invention, the RDBMS software is the DB2 product, offered by IBM for the AS400 or z/OS operating systems, the Microsoft Windows operating systems, or any of the UNIX-based operating systems supported by the DB2. Those skilled in the art will recognize, however, that the present invention has application to any RDBMS software that uses SQL, and may similarly be applied to non-SQL queries. The electronic storage device 106 further includes a log file 116.

FIG. 1 further illustrates a software environment of the present invention which enables the preferred embodiments of the present invention. For that purpose the console 102 of the system shown in FIG. 1 may include a peephole reorganization utility 110 which incorporates preferred methods of the present invention for reorganization of data block sets and for saving re-ordered sets in the electronic data storage device 106.

Because the preferred embodiments of the present invention may be incorporated in an external, auxiliary server, FIG. 1 also shows such an auxiliary server 120 which has at least one auxiliary processor 122 connected to one or more electronic data storage devices 136, such as disk drives, that store one or more relational databases 137 and a log file 138. Auxiliary processor 122 is also connected to a computer memory 124, DBMS 126 and a peephole reorganization utility 130 of the present invention.

Figure 2:
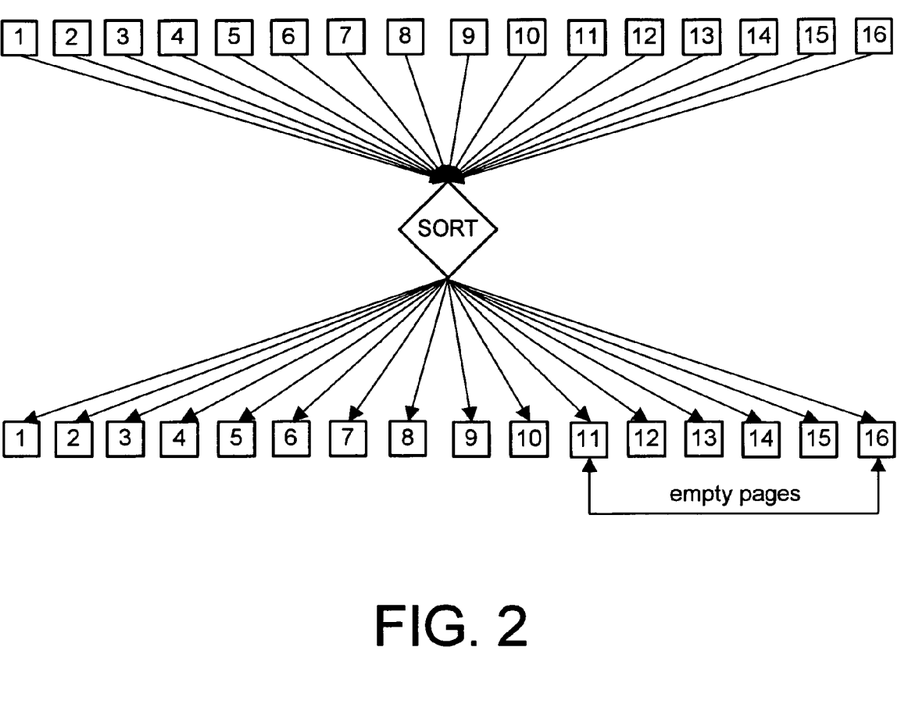
FIG. 2 illustrates a result of a peephole reorganization without an overlap, according to the preferred embodiments of the present invention.

One of the purposes of using reorganization is restoration of page free space and empty pages. Thus, the present invention restores page free space, to be utilized for data inserts and variable length record growth, as shown in FIG. 2, which shows empty pages 11-16 obtained as a result of a peephole reorganization, according to the preferred embodiments of the present invention.

Figure 3:
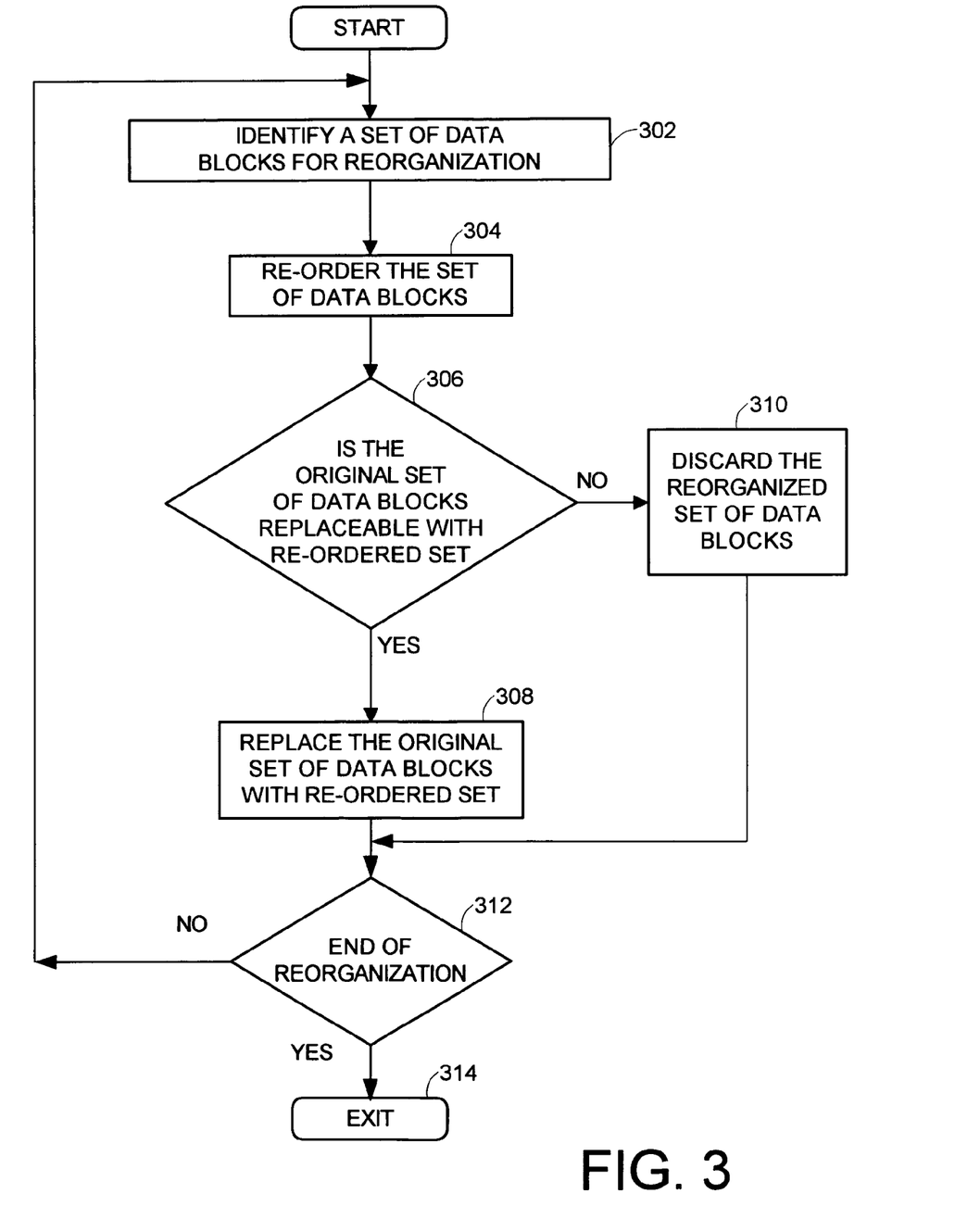
FIG. 3 illustrates a flowchart of a computer-based method performing the reorganization, according to the preferred embodiments of the present invention.

FIG. 3 illustrates a flowchart of a computer-based method performing the peephole reorganization, according to the preferred embodiments of the present invention. The reorganization utility 110, 130 process is invoked on each set of data blocks sequentially and this process continues until the exit from reorganization utility is requested in step 314.

The preferred methods of the present invention in step 302 of FIG. 3 identify a set of data blocks to be chosen for reorganization, re-order their data in step 304 and then determine, in step 306, whether the original data blocks can be replaced with the reorganized (re-ordered) data blocks. If so, the original data blocks are replaced with the reorganized data blocks in step 308 and a new set of data blocks can be chosen for reorganization, in step 302. If not, in step 310 the reorganized data blocks are discarded and a new set of data blocks can be chosen for reorganization in step 302. After each reorganization attempt the method tests, in step 312, whether the end of reorganization is requested and, if so, the utility exits in step 314. The result is a set of data blocks that is not perfectly reorganized, as accomplished with some conventional techniques, but has a good enough organization which improves with increased frequency of reorganization. Moreover, some blocks of data may not be reorganized at all, when the reorganization is first attempted, but get reorganized at a later time, for example, when not in use.

With the preferred methods of the present invention it is possible that re-ordered records will not fit back within the original set of fixed sized blocks due to the way the records would now fit within each data block and thus the reorganized data blocks cannot be reloaded. In that case, the current set of records and data blocks has to be discarded in step 310 and a new set of blocks is chosen in step 302. In a less extreme case, where the records could not be distributed across the data block set and the page free space cannot be restored according to the free space specification, it may still be possible to reload into the original set of data blocks, in step 308, so that as many pages as possible get their free space restored and the rest of the pages have all the records reloaded into the original set of data blocks but without the free space. Then, the next peephole should try to include these remaining pages which were reloaded without the free space.

The peephole reorganization of the present invention provides restoration of free space and empty pages and is beneficial because it is not disruptive at all, because all database data are available during the reorganization for concurrent data manipulation. Further, the reorganization can be stopped at any time without loss of preceding work, thus providing partial reorganization of subsets of data. Moreover, it requires only a minimal temporary workspace. Although the preferred methods of the present invention are primarily designed for offloading to a loosely coupled or auxiliary server 120 or other external processing system, such as a data storage system processor, it could also run on other systems.

The peephole reorganization methods of the present invention perform partial reorganization of data in stepwise mode because the invention performs a step-by-step reorganization of a sliding (moving) peephole of data during concurrent data manipulation. In the preferred methods a set of data blocks or pages is chosen for reorganization in step 302 of FIG. 3. Re-ordering step 304 of FIG. 3 is further illustrated in FIG. 4. In step 402 of FIG. 4, the chosen data blocks are guaranteed consistent within themselves and secured against change during unload by latching. The data block records (rows) are unloaded in step 404 into a temporary workspace, noting the current block number and record within block number (RID) of each record. On completion of the unload, the data blocks are freed for update by unlatching in step 406. The unloaded records are sorted, in step 408, in an optional order which is usually user-specified, and then reloaded back in step 308 of FIG. 3, noting the new block number and record within block number of each record, to enable directory mapping of each old record position to the new position.

Figure 4:
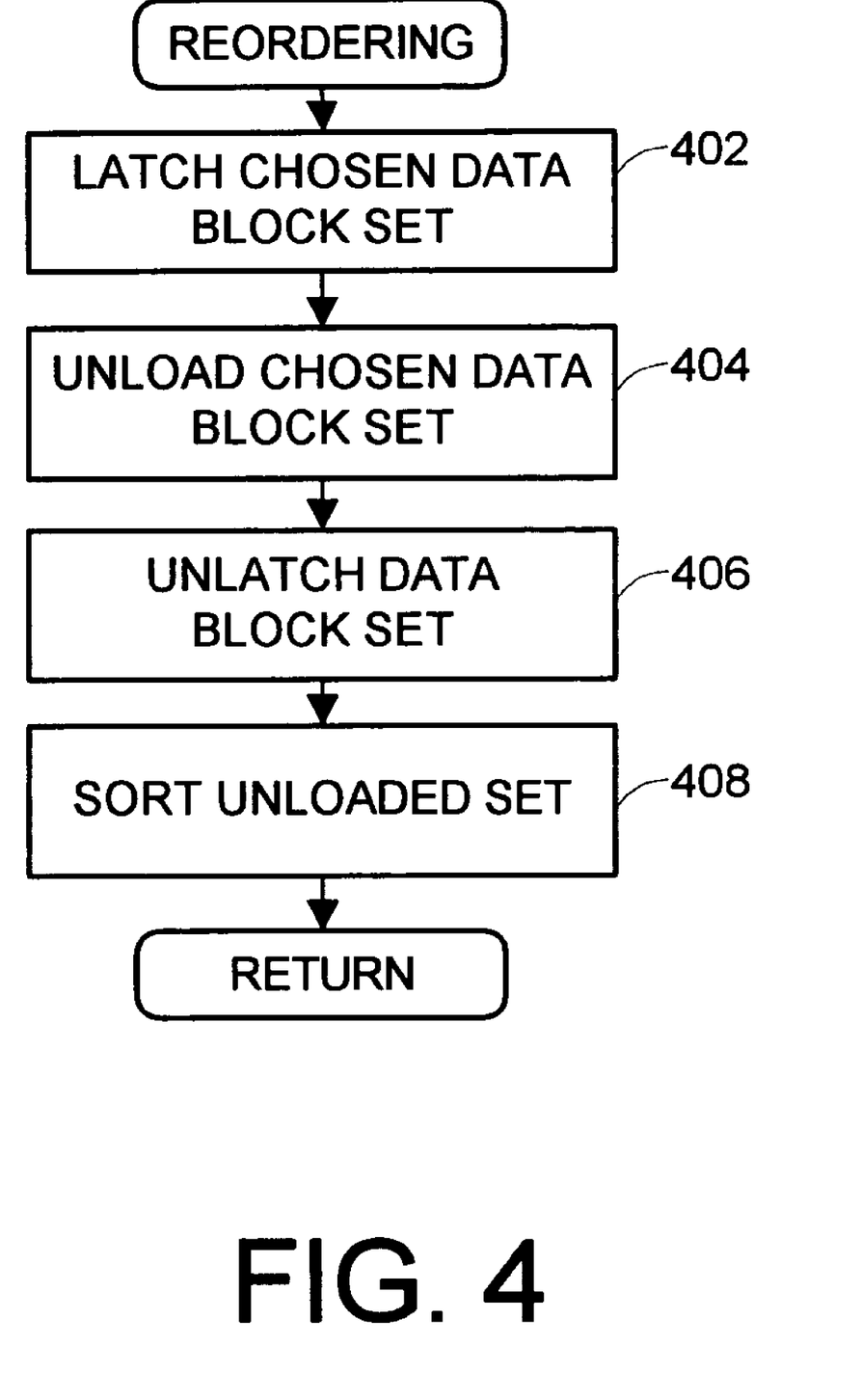
FIG. 4 illustrates a flowchart of a computer-based method performing the re-ordering, according to the preferred embodiments of the present invention.
Figure 5:
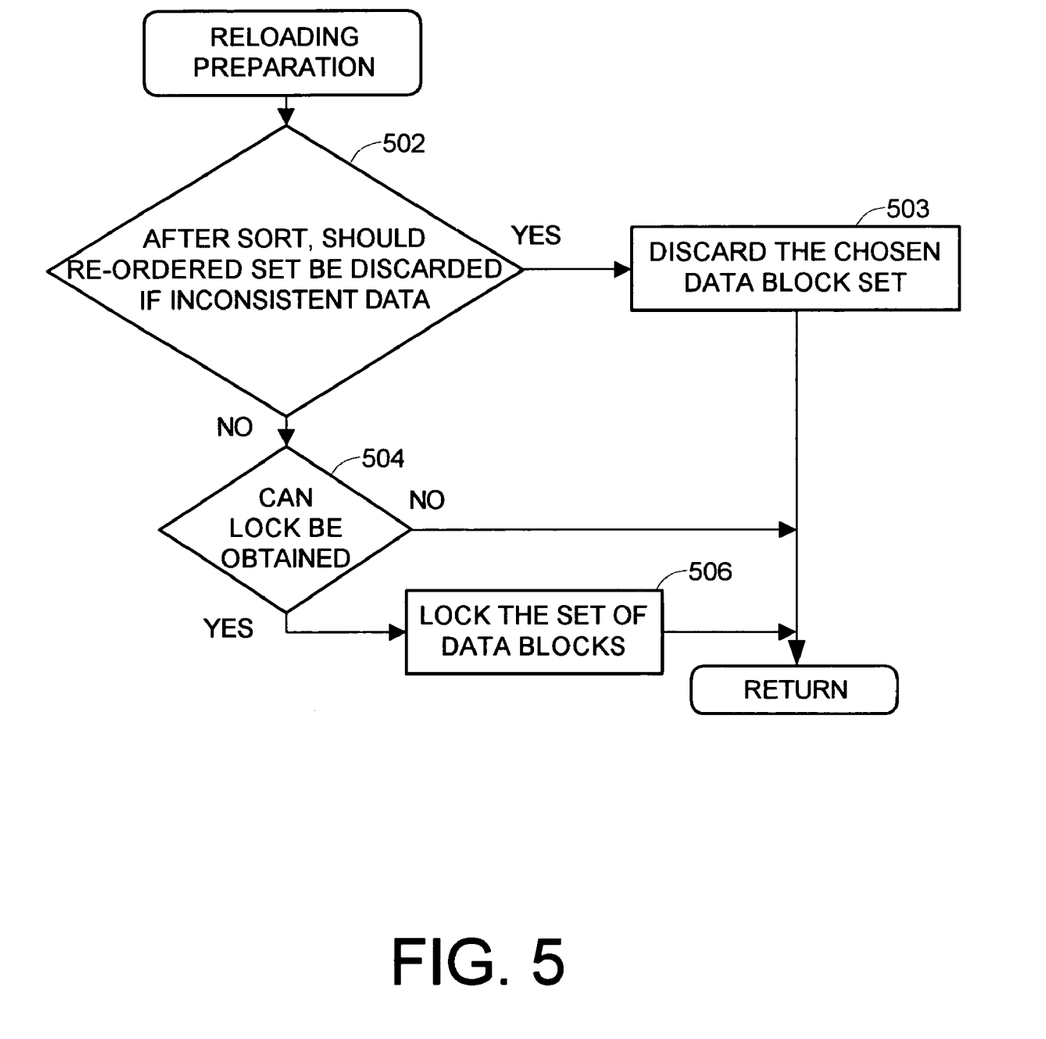
FIG. 5 illustrates a flowchart of a computer-based method performing the reloading preparation, according to the preferred embodiments of the present invention.

After the sorting step 408 of FIG. 4, the preferred embodiments of the present invention continue with reloading 308 step of FIG. 3. Preparation steps of reloading 308 step are shown in FIG. 5. Step 502 of FIG. 5 checks to verify whether the block number and record number have changed as a result of the sorting. If no change has occurred, then a new set of data blocks will always be chosen for reorganization because the data was already correctly organized. Otherwise, the reorganized data blocks have to be secured for reloading in a way to guarantee that no uncommitted changes occur on the blocks. This is accomplished in step 506 by locking the location of original data blocks with locks, which are a stronger means of securing than latching. In step 502 the reorganized data blocks are also checked for consistency, to verify no changes have occurred since the records were unloaded. It is also necessary to insure there are no users holding a position on any of the data blocks that are not holding any locks. If it is determined, in step 504, that the locks could not be obtained or it is determined in step 502 that changes have occurred since the records were unloaded, the method discards the data blocks in step 503 and returns to step 302 of FIG. 3 to reprocess the chosen blocks, as they now exist, or to choose another set of data blocks for reorganization.

Figure 6:
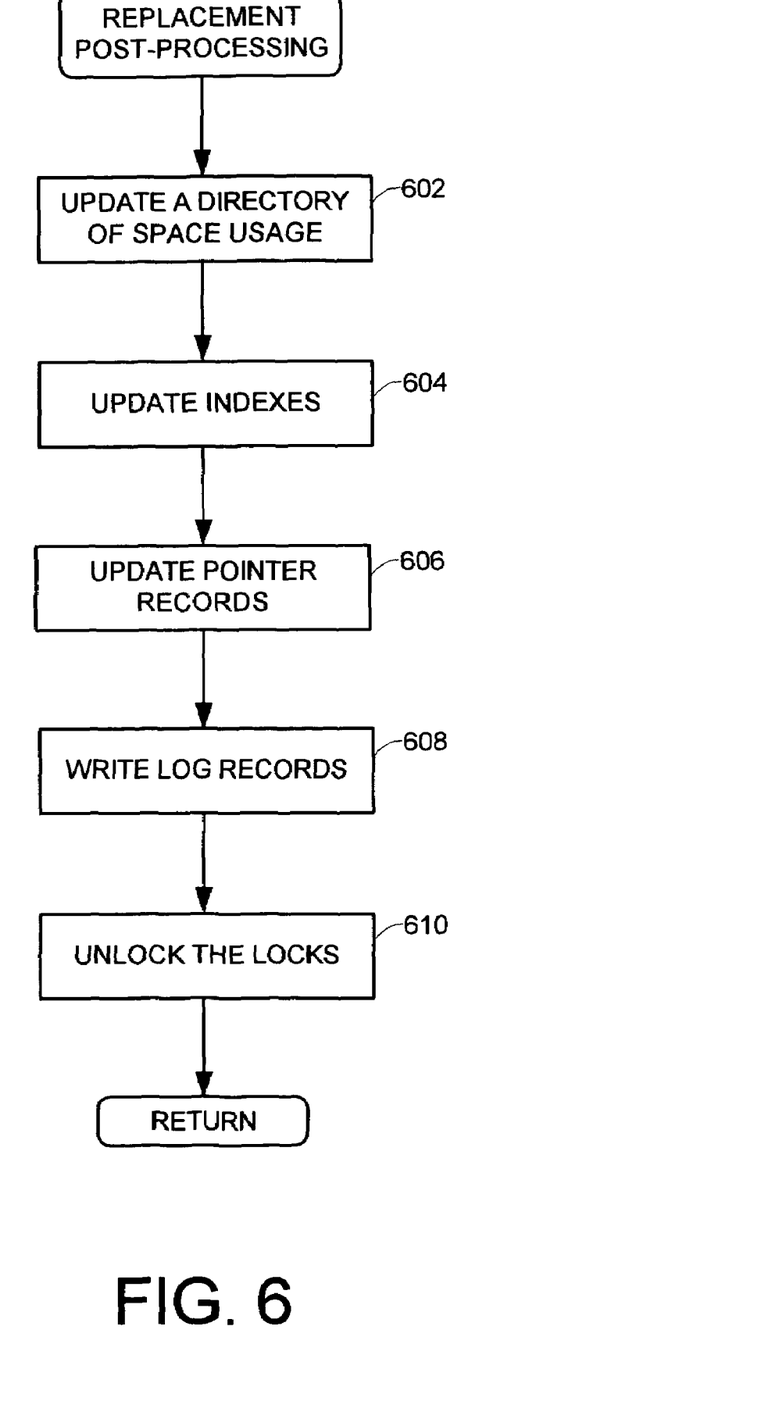
FIG. 6 illustrates a flowchart of a computer-based method performing the replacement post-processing, according to the preferred embodiments of the present invention.

Otherwise, the reloading of data blocks can go forward and the original data blocks are replaced with the reorganized data blocks in step 308 of FIG. 3. Post-processing steps of reloading step 308 are shown in FIG. 6. Typically, there is a directory of space usage that records the space utilized on each data block, which must be updated, in step 602 of FIG. 6, to reflect the reloaded data block space usage. If there are indexes which pointed to the prior block number and record number positions of the data then each index entry must be updated, in step 604, to the new position using the old and new mapping information. Mapping may be accomplished with the use of a mapping table containing old and new positions of the data. For efficiency, the old and new mapping information for each record can also contain the index key value for each index of each record.

Overflow records and pointers to them have to be handled as well in the preferred embodiments of the present invention, in step 606 of FIG. 6. If a method encounters a pointer referencing a record within the set of pages, both are simply collapsed into a normal record. If a pointer references an overflow record, which is located outside of the set of pages, the record is relocated like a normal record and the pointer to the overflow record is updated to reflect the new location. Next, in step 608, log records are written into the log file 116, 138 of FIG. 1 and the method releases the securing mechanism on the data blocks by unlocking the locks in step 610 of FIG. 6. The method proceeds with reorganization and repeats reorganization with a new set of blocks, in step 302 of FIG. 3.

A method for identifying and selecting a set of data blocks that are a next reorganization candidate is performed in step 302 of FIG. 3. There are several preferred aspects of the present invention that can be used for choosing the next set of data blocks. Some preferred methods use a disjoint set of data blocks that can be chosen randomly. In the random method of selection of the set of data blocks, where the free space restoration is non-linear, a preferred aspect of the present invention selects the first page where the free space could not be honored and chooses it as the starting point of the next disjoint set of data blocks selected for reorganization.

Alternatively, some preferred aspects of the present invention search for a contiguous set of data blocks which are not currently being read or updated and are, thus, candidates for reorganization by the preferred method embodiment of the present invention. Thus, some preferred embodiments of the peephole reorganization of the present invention chose a next succeeding contiguous set of data blocks as the reorganization candidate.

Figure 8:
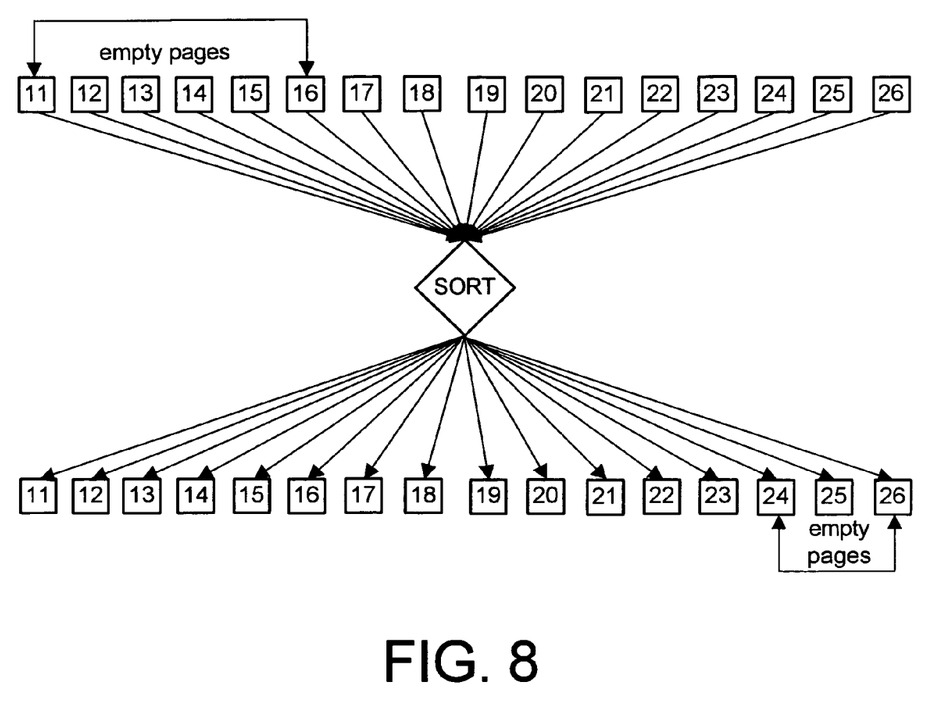
FIG. 8 illustrates a result of an overlapping peephole reorganization, according to the preferred embodiments of the present invention.

Most preferred embodiments of the present invention perform an overlapping peephole reorganization method and chose, in addition to the next succeeding contiguous set of data blocks, an overlap segment containing a subset of the preceding set of data blocks. FIG. 8 shows a result of reorganization performed with the peephole reorganization with overlapping peephole method, according to the preferred embodiments of the present invention.

The overlap segment at a minimum has to include a set of empty pages other than the pages intentionally left blank, specified at creation time as FREEPAGE. The number of empty pages in the overlap segment should be chosen in such a way to provide enough space for reloading of the reorganized records allowing for some free space. Thus, the overlap segment size may be chosen as a fixed percentage of data blocks' size or as a fixed number of data blocks.

Figure 7:
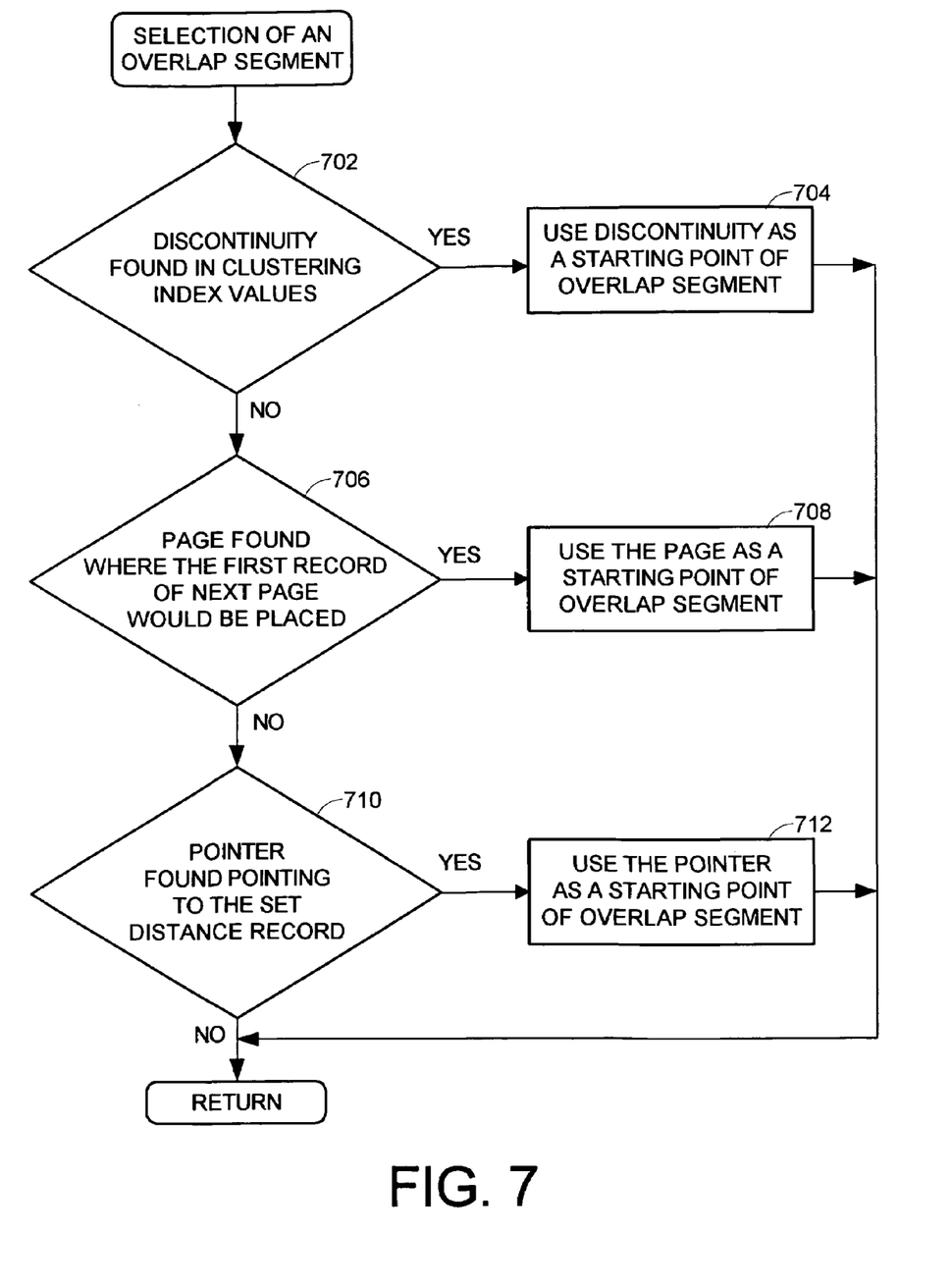
FIG. 7 illustrates a flowchart of a computer-based method performing the selection of an overlap segment, according to the preferred embodiments of the present invention.

The use of overlapping subsets of data blocks and the picking of the overlap by a method other than by choosing its size as a fixed number of blocks or percentage of blocks' size provide a great improvement in ordering of the data, accomplished by the present invention. Following alternative preferred aspects of the present invention for choosing a starting point of an overlap subset of the preceding set of data blocks are shown in FIG. 7. One preferred method picks the overlap between two sets of data blocks by looking for a discontinuity in ordering values. When looking for a discontinuity in ordering values the preferred method of the present invention performs an analysis of a portion of the record used for ordering from the last block to the first block or from the first block to the last block, thus looking for discontinuity (gap) in clustering index values. This discontinuity could be a gap in data values where the data value could change by a larger percentage than the average percentage of the preceding data value changes. If such a discontinuity is found in step 702, it is used as the starting point of the overlap segment containing a subset of the preceding set of data blocks, in step 704.

Another alternative preferred method for choosing the overlap is to use the page where the first record of the next page would be placed, if it were placed based on the ordering of the data. If such a page is found in step 706, it is used in step 708 as the starting point of the overlap segment containing a subset of the preceding set of data blocks. Yet another alternative preferred method for choosing the overlap involves analyzing pointers. If a pointer record is found, in step 710, that was not collapsed with the overflow records but the overflow records have a distance from the pointer record equal to the data block set size, i.e., pointer record is within NEARINDREF distance, that pointer record is used as a starting point of the overlap segment containing a subset of the preceding set of data blocks, in step 712. If the subset is the entire prior set or the subset is empty, then another method has to be utilized for choosing the next set of data blocks, such as the fixed percentage method described above.

The present method of reorganization continues with a new data block set even if a particular set of blocks cannot be reorganized at the present time. Thus, utilization of the preferred embodiments of the present invention does not result in a perfect ordering of data values because not all data blocks get reorganized with the first attempt and at no time is the whole database reorganized. However, the small disorder of the data is similar to that which occurs shortly after any database reorganization. The method of sliding overlapping peepholes of the present invention is somewhat similar to a conventional bubblesort method, which starts with a window having the entire set of data and where each succeeding iteration decreases the window size by 1. However, in the present invention each window includes only a small subset of data that gets perfectly reorganized. Because of the overlap, each iteration reorganizes part of the proceeding data block and succeeding data blocks. Any record that should be placed in any subsequent data block will eventually end up in the correct order. However, if a record is encountered which should be moved to a data block somewhere prior to the previous data block, the method places it in the previous data block, which is not the ordered position. Thus, the result of reorganization, performed by the preferred embodiments of the present invention, is not a perfectly ordered database but it is a pretty good approximation.

The present invention is preferably useable in data management products and tools, such as sorting products. It may be implemented in data storage products' utilities package of DB2 for z/OS, such as IBM DS8000. However, the present invention is broadly applicable to all DBMS products and tools, for all database applications and DBMS tools vendors. Although it is presently designed for DB2 products for z/OS and is preferably used for developing applications for DB2 machine, the technology may be applied to any other database manager products, such as Oracle, Informix, Sybase, SQL Anywhere, BMC, Microsoft SQL Server and Computer Associates products. The method and system of the present invention may be used in a distributed computing environment in which two or more computer systems are connected by a network, such as the World Wide Web, including environments in which the networked computers are of different type.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer database reorganization method for reorganizing one set of database data blocks at a time, allowing concurrent data manipulation, comprising:

identifying, by a processor an original set of data blocks for reorganization in a sliding peephole mode, wherein the original identified set of data blocks comprise a subset of data within a database, the database comprising a plurality of data blocks eligible for reorganization, a size of the original identified set of data blocks selected below a predetermined threshold size relative to the database size such that the probability of concurrent manipulations of data in the original identified set of data blocks during reorganization of the original identified set of data blocks is below a probability threshold;

latching the original identified set of data blocks wherein manipulations of data in the original identified set of data blocks are not permitted during unloading of a copy of the original identified set of data blocks into a temporary workspace;

unloading a copy of the set of identified original data blocks into a temporary workspace to form a copied set of data blocks;

unlatching the identified original set of data blocks such that concurrent manipulations of the identified original set of data blocks are permitted during reorganization of the copied set of data blocks in the temporary workspace;

re-ordering the copied set of data blocks in the temporary workspace;

determining whether changes have occurred to the original identified set of data blocks during re-ordering of the copied set of data blocks; and discarding the re-ordered, copied set of data blocks in the temporary workspace in response to determining that changes have occurred to the original identified set of data blocks during re-ordering.

2. The method according to claim 1, further comprising in response to determining that no changes have occurred to the original identified set of data blocks during re-ordering of the copied set of data blocks:

locking the original identified set of data blocks to guarantee no uncommitted changes on the original identified set of data blocks during reloading of the re-ordered, copied set of data blocks into the database;

reloading the re-ordered, copied set of data blocks back to a same location of the original identified set of data blocks such that the original identified set of data blocks are replaced by the re-ordered, copied set of data blocks to form a reorganized set of data blocks; and unlocking the reorganized set of data blocks.

3. The method according to claim 2, wherein the step of reloading comprises verifying that the original identified set of data blocks can be replaced with the re-ordered, copied set of data blocks, wherein if not verified, discarding the re-ordered, copied set of data blocks, and wherein if verified, locking the original identified set of data blocks to guarantee no uncommitted changes on the original identified set of data blocks during reloading of the re-ordered, copied set of data blocks into the database, reloading the re-ordered, copied set of data blocks back to a same location of the original identified set of data blocks such that the original identified set of data blocks are replaced by the re-ordered, copied set of data blocks to form a reorganized set of data blocks, updating a space usage directory, indexes and pointers, writing log records and unlocking the reorganized set of data blocks.

4. The method according to claim 3, wherein the step of verifying that the original set of identified data blocks can be replaced with the re-ordered, copied set of data blocks comprises: verifying whether a data block and record number have changed as a result of the re-ordering, and verifying the re-ordered, copied set of data blocks consistency from beginning of the unloading.

5. The method according to claim 1, wherein the step of identifying the original set of data blocks for reorganization comprises selecting a disjoint set of blocks.

6. The method according to claim 5, wherein the disjoint set of blocks is chosen randomly.

7. The method according to claim 1, wherein the step of identifying the original set of data blocks for reorganization comprises selecting a next succeeding contiguous set of data blocks which are not currently being read or updated.

8. The method according to claim 1, wherein the step of identifying the original set of data blocks for reorganization comprises identifying a first set of data blocks for reorganization, the method further comprising using an overlapping peephole method to identify a second set of data blocks for reorganization, the overlapping peephole method comprising: choosing a next succeeding set of data blocks plus an overlap segment, wherein the overlap segment includes a set of empty pages other than intentionally specified free pages, and wherein the overlap segment is a subset of the first set of data blocks.

9. The method according to claim 8, wherein the overlap segment is chosen by size, as a fixed percentage of data blocks' size or as a fixed number of data blocks.

10. The method according to claim 8, wherein the overlap segment is chosen to start at a discontinuity in clustering index values.

11. The method according to claim 8, wherein the overlap segment is chosen to start at a page where a first record of the next page would be placed, if it were placed based on an ordering of the data.

12. The method according to claim 8, wherein the overlap segment is chosen to start at a pointer record to an overflow record having a distance from the pointer record equal to a size of the second set of blocks.

13. The method according to claim 1, wherein the method is executed in a processor selected from the group consisting of: a loosely coupled processor, an auxiliary external processor, and a data storage system processor.

14. A method for reorganizing one set of database data blocks at a time, allowing concurrent data manipulation, the method comprising:
identifying a first set of data blocks for reorganization in a sliding peephole mode by way of a processor and a memory, wherein the identified first set of data blocks comprise a subset of data within a database, the database comprising a plurality of data blocks eligible for reorganization, a size of the identified first set of data blocks selected below a predetermined threshold size relative to the database size such that the probability of concurrent manipulations of data in the identified first set of data blocks during reorganization of the identified first set of data blocks is below a probability threshold;
re-ordering a copy of the identified first set of data blocks;
replacing the identified first set of data blocks with copy of the re-ordered the identified first set of data blocks; and
identifying a second set of data blocks for reorganization in an overlapping peephole method, the second set of data blocks for reorganization comprising a next succeeding set of data blocks plus an overlap segment, wherein the overlap segment includes a set of empty pages other than intentionally specified free pages, and wherein the overlap segment is a subset of the first set of data blocks.

15. The method according to claim 14, wherein the step of re-ordering comprises latching the set of data blocks before unloading into a temporary workspace, unloading the set of data blocks noting the current block number and record number for mapping, unlatching the set of data blocks, and sorting the unloaded set of data blocks.

16. The method according to claim 14, wherein the step of replacing comprises verifying that the original set of data blocks can be replaced with the re-ordered set of data blocks, and wherein if not verified, discarding the re-ordered set of data blocks, and wherein if verified, locking the set of data blocks to guarantee no uncommitted changes on the blocks, reloading the re-ordered set of data blocks back to a same location of the original set of data blocks, updating a space usage directory, indexes and pointers, writing log records and unlocking.

17. The method according to claim 16, wherein the step of verifying that the original set of data blocks can be replaced with the re-ordered set of data blocks comprises verifying whether the data block and record number have changed as a result of the sorting, and verifying the data blocks consistency from beginning of the unloading.

18. The method according to claim 14, wherein the step of identifying the set of data blocks for reorganization comprises selecting a disjoint set of blocks.

19. The method according to claim 18, wherein the disjoint set of blocks is chosen randomly.

20. The method according to claim 14, wherein the step of identifying the set of data blocks for reorganization comprises selecting a next succeeding contiguous set of data blocks which are not currently being read or updated.

21. The method according to claim 14, wherein the overlap segment is chosen by size, as a fixed percentage of data blocks' size or as a fixed number of data blocks.

22. The method according to claim 14, wherein the overlap segment is chosen to start at a discontinuity in clustering index values.

23. The method according to claim 14, wherein the overlap segment is chosen to start at a page where a first record of the next page would be placed, if it were placed based on an ordering of the data.

24. The method according to claim 14, wherein the overlap segment is chosen to start at a pointer record to an overflow record having a distance from the pointer record equal to a size of the second set of blocks.

25. The method according to claim 14, wherein the method is executed in a processor selected from the group consisting of: a loosely coupled processor, an auxiliary external processor, and a data storage system processor.

26. A computer system for reorganizing one set of database data blocks at a time, allowing concurrent data manipulation, the system comprising:
- an electronic data storage device, the electronic data storage device storing one or more relational databases;
- a database reorganization tool configured to operate on the one or more relational databases to reorganize data within the one or more relational databases in a sliding peephole mode, the database reorganization tool performing the operations of:
- identifying an original set of data blocks for reorganization in a sliding peephole mode, wherein the original identified set of data blocks comprise a subset of data within the database, the database comprising a plurality of data blocks eligible for reorganization, a size of the original identified set of data blocks selected below a predetermined threshold size relative to the database size such that the probability of concurrent manipulations of data in the original identified set of data blocks during reorganization of the original identified set of data blocks is below a probability threshold;
- latching the original identified set of data blocks such that manipulations of data in the original identified set of data blocks are not permitted during unloading of a copy of the original identified set of data blocks into a temporary workspace;
- unloading a copy of the set of identified original data blocks into a temporary workspace to form a copied set of data blocks;
- unlatching the identified original set of data blocks such that concurrent manipulations of the identified original set of data blocks are permitted during reorganization of the copied set of data blocks in the temporary workspace;
- re-ordering the copied set of data blocks in the temporary workspace;
- determining whether changes have occurred to the original identified set of data blocks during re-ordering of the copied set of data blocks; and
- discarding the re-ordered, copied set of data blocks in the temporary workspace in response to determining that changes have occurred to the original identified set of data blocks during re-ordering.

27. The system according to claim 26, further comprising in response to determining that no changes have occurred to the original identified set of data blocks during re-ordering of the copied set of data blocks:
- locking the original identified set of data blocks to guarantee no uncommitted changes on the original identified set of data blocks during reloading of the re-ordered, copied set of data blocks into the database;
- reloading the re-ordered, copied set of data blocks back to a same location of the original identified set of data blocks such that the original identified set of data blocks are replaced by the re-ordered, copied set of data blocks to form a reorganized set of data blocks; and
- unlocking the reorganized set of data blocks.

28. The system according to claim 27, wherein the step of reloading comprises verifying that the original identified set of data blocks can be replaced with the re-ordered, copied set of data blocks, wherein if not verified, discarding the re-ordered, copied set of data blocks, and wherein if verified, locking the original identified set of data blocks to guarantee no uncommitted changes on the original identified set of data blocks during reloading of the re-ordered, copied set of data blocks into the database, reloading the re-ordered, copied set of data blocks back to a same location of the original identified set of data blocks such that the original identified set of data blocks are replaced by the re-ordered, copied set of data blocks to form a reorganized set of data blocks, updating a space usage directory, indexes and pointers, writing log records and unlocking the reorganized set of data blocks.

29. The system according to claim 28, wherein the step of verifying that the original set of identified data blocks can be replaced with the re-ordered, copied set of data blocks comprises: verifying whether a data block and record number have changed as a result of the re-ordering, and verifying the re-ordered, copied set of data blocks consistency from beginning of the unloading.

30. The system according to claim 26, wherein the step of identifying the original set of data blocks for reorganization comprises selecting a disjoint set of blocks.

31. The system according to claim 30, wherein the disjoint set of blocks is chosen randomly.

32. The system according to claim 26, wherein the step of identifying the original set of data blocks for reorganization comprises selecting a next succeeding contiguous set of data blocks which are not currently being read or updated.

33. The system according to claim 26, wherein the step of identifying the original set of data blocks for reorganization comprises identifying a first set of data blocks for reorganization, the method further comprising using an overlapping peephole method to identify a second set of data blocks for reorganization, the overlapping peephole method comprising: choosing a next succeeding set of data blocks plus an overlap segment, wherein the overlap segment includes a set of empty pages other than intentionally specified free pages, and wherein the overlap segment is a subset of the first set of data blocks.

34. The system according to claim 33, wherein the overlap segment is chosen by size, as a fixed percentage of data blocks' size or as a fixed number of data blocks.

35. The system according to claim 33, wherein the overlap segment is chosen to start at a discontinuity in clustering index values.

36. The system according to claim 33, wherein the overlap segment is chosen to start at a page where a first record of the next page would be placed, if it were placed based on an ordering of the data.

37. The system according to claim 33, wherein the overlap segment is chosen to start at a pointer record to an overflow record having a distance from the pointer record equal to a size of the second set of blocks.

38. The system according to claim 26, wherein the method is executed in a processor selected from the group consisting of: a loosely coupled processor, an auxiliary external processor, and a data storage system processor.

* * * * *

UNITED STATES PATENT AND TRADEMARK OFFICE
CERTIFICATE OF CORRECTION

PATENT NO. : 7,603,336 B2
APPLICATION NO. : 11/313117
DATED : October 13, 2009
INVENTOR(S) : Cotner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 589 days.

Signed and Sealed this

Fifth Day of October, 2010

David J. Kappos
*Director of the United States Patent and Trademark Office*